June 4, 1968  CARL-HERMANN HEISE  3,386,394
METHOD AND APPARATUS FOR WASTE DISPOSAL
Filed Sept. 28, 1966
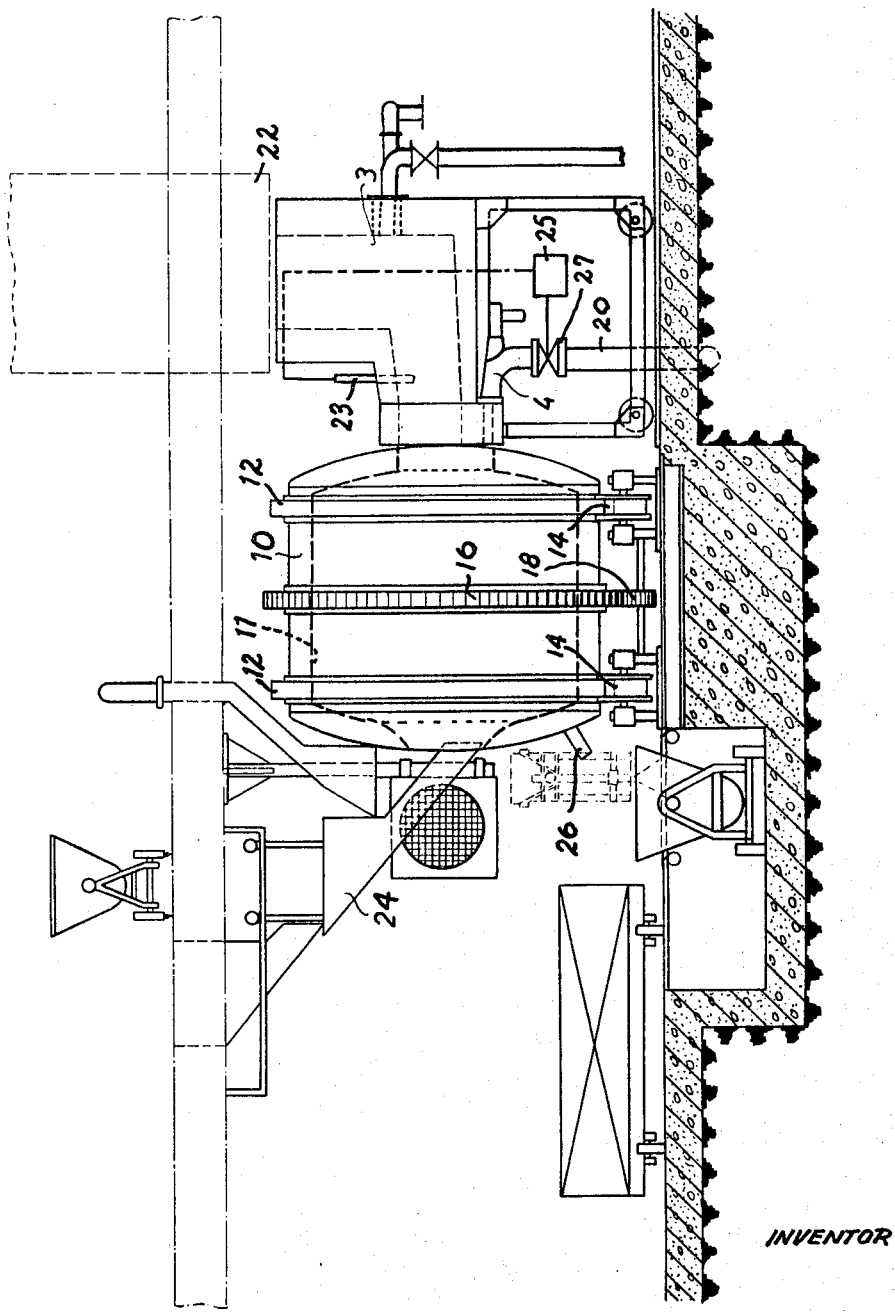
INVENTOR
CARL-HERMANN HEISE
by Melvin A. Crosby United States Patent Office 3,386,394
Patented June 4, 1968

3,386,394
METHOD AND APPARATUS FOR
WASTE DISPOSAL
Carl-Hermann Heise, Alfeld, Leine, Germany, assignor to
Firma Alfelder Eisenwerke
Filed Sept. 28, 1966, Ser. No. 582,687
Claims priority, application Germany, Nov. 6, 1965,
H 57,609
8 Claims. (Cl. 110—14)

ABSTRACT OF THE DISCLOSURE

Method and apparatus for waste disposal in which waste material is introduced into one end of a short drum-like rotary furnace which contains a bath, preferably of quartz sand and soda ash, and into which furnace fuel gases are supplied at the other end while combustion gases are withdrawn also from the said one end of the furnace, and wherein the temperature of the combustion gases is monitored for controlling the supply of fuel gases to the furnace.

---

This invention relates to the disposal of waste material such as household trash, including garbage, and industrial wastes.

The disposal of trash and waste of the nature referred to above has always been a problem and, as population density increases, the problem of the disposal of these materials increases. In particular, the disposal of such material must be such that no pollution of drinking water is occasioned thereby. This phase of the problem has also increased with increasing population density because of the greatly increasing use of water.

As is known, trash, garbage, waste materials, and sewage contains a variety of organic and inorganic compounds and, furthermore, the particular distribution and concentration of the compounds will vary from place to place. Still further, the food industry is increasing in technological accomplishments and food packaging is becoming an increasing portion of the waste products, particularly, from domestic establishments. The disposing and complete annihilation of such waste products is indeed a serious problem at the present time.

It was formally the case that garbage could be converted as by fermenting, and similar processes to a material suitable for a fertilizer to be used in connection with growing crops. This method of disposing of garbage however, requires that the garbage be relatively free of packaging materials and the like because these materials simply can not be reduced in this manner to usable fertilizing materials.

One of the most serious of the problems that are met in connection with the disposing of wastes of the nature referred to is the disposal of plastics, especially the high polymer plastics because these materials deteriorate slowly and it is not even now known into what compounds the material of this nature deteriorates, or how long is required for the material to break down by natural processes into any sort of usable substances.

Included in the classification of waste materials that must be disposed of are sludges from settling tanks and which sludges contain all wastes in solids as are removed, for example, in sewage purification plants.

Must time and effort has been devoted to the problem of burning garbage and trash and refuse, with the solid portions of the material thus burned being converted into a slag. Heretofore however, the experiments along these lines have failed to lead to any economical usable process.

From the art of metal smelting, the basic processes of reduction and oxidation are well known. In metallurgy however, the processes of reduction and oxidation are carried out principally to remove specific elements from the raw material and the product obtained in this manner is reduced or oxidized so that the end result is a substantially pure metal. The Krupp direct process, also known as the bloomery process, is an example of this sort of smelting of acid ores.

While it has been recognized for some considerable time that efficient and economical trash disposal could be best done by some sort of combustion process, all systems and processes known in the prior art and which have been tried up to the present time have certain definite drawbacks. For example, the following flaws can be identified as occurring in connection with any known process up to the present time.

(1) Bulky trash and non-combustible materials must be sorted out prior to the combustion process and this involves considerable labor, including manual labor where the parts to be sorted out surpass a certain size. Magnetic parts can be sorted out for example, with the use of a magnet but not-magnetic parts and which would include plastic, aluminum and other materials of this nature can not be treated in this manner and manual labor is required to effect the sorting.

(2) The trash or refuse to be disposed of will have a different composition for differing seasons of the year and for the type of housing project or industrial installation from which it comes and also depending upon the degree of commercial activity in the area and which might vary with the particular seasons. The variation in the nature of the refuse and trash to be disposed of will thus effect a substantial change in the caloric value of the material which will, in turn, strongly influence the combustion process. As the caloric value of the material to be disposed of and as the climate changes, the permeability of the material will also change and thus, the behavior of the material in a combustion furnace will change. Thus, all conditions for a proper combustion of the material are influenced, such as the air to be blown through the grates on which the material rest while burning, the rate of revolving of a furnace when it is of that type, the temperature in the fire box, the amount of heat supplied while the material burns, the velocity of the movement of the material through the furnace, and other variables of this nature.

(3) A residue of slag and solids, due to the differing composition of the waste material delivered to the furnace makes the removal thereof difficult and expensive.

(4) The portions such as inorganic or organic materials which could become fermented or dissolved which remain with the slag or the residual solids are so large that the storage of the material would be difficult and it would be absolutely necessary for materials of this nature to be stored in regions where water that might find its way into drinking water could not come into contact with it.

(5) The cost of the combustion installation to take into account all of the foregoing variables and which installations might include movable grates such as traveling grates, or roller grates, is high because the caloric value of refuse such as garbage, for example, lies only between 500 and 1500 kilocalories per kilogram.

(6) According to all installations known according to the prior art, the combustion process itself is carried out in various zones such as a drying zone, a dry distillation zone, an ignition zone, a zone of main combustion, and a zone of after-combustion. It has heretofore been necessary to pass the refuse to be disposed of through these several zones in order to effect proper combustion thereof. A particular problem involved in process of this nature is that the refuse at the present time includes a substantial amount of plastics, particular high polymer plastics, which tend to decompose in the dry distillation zone and the decomposition products thereof can not safely be discharged directly into the atmosphere.

The increasing quantity of such materials also imposes heavy loads upon the drying and dry installation zones. Furthermore, the distillation zone is often combined with another process and this can effect the creation of corrosive agents which interfere with the utilization of waste heat so that heretofore known processes of the nature referred to are extremely difficult to operate efficiently.

(7) Heretofore known installations are difficult to adjust to varying amounts of refuse which will take place, for example, in connection with garbage which is subject to seasonal changes because of tourist trade and the like.

The present invention proposes the provision of an apparatus for effecting combusion of refuse of the nature referred to in which the problems referred to above are eliminated.

The drawing illustrates a rotary furnace arrangement according to the present invention.

In general, the present invention as practiced by utilizing a rotary furnace which is relatively short in the axial direction and inside which furnace a melt is disposed which can be referred to by the designation furnace bath. This melt, or furnace bath, can readily be adapted to the various types of garbage or trash or refuse delivered to the furnace for effecting efficient combustion thereof. The furnace is provided with a lining which, similarly, is chosen to have either a basic or an acid reaction according to the particular circumstances.

According to the present invention, quartz sand and soda ash may be used as the furnace bath for the combustion of garbage.

In operation, the rotation of the rotary furnace causes the melt to be intimately admixed with the refuse fed into the furnace and this brings about excellent combustion while avoiding all of the disadvantages outlined above.

Referring now to the drawings, the axially short rotary furnace is indicated therein at 10. It will be seen that the furnace has bands 12 thereon resting on rollers 14 so that the furnace can be rotated. About the middle of the furnace there is a large ring gear 16 driven by a pinion 18. The diameter of the drum or furnace is about equal to the length thereof and the furnace is made of an outer shell lined with a suitable refractory. Such a furnace is compact and is easy to set into rotation and to maintain in a rotating condition.

The furnace is heated by a supply of fuel from a conduit 20 which enters the opening at the right side of the furnace and enters the furnace via burner 4 and then follows a horseshoe path therein during combustion and departs from the same side of the furnace and is eliminated through a stack 22. The trash to be charged into the furnace is charged therein through a chute 24 which extends into the other open side of the furnace. Slag and the like can be tapped from the furnace through an outlet 26 into a suitable cart and conveyed from the furnace.

In operation, the furnace is brought up to temperature and there is then placed in the furnace or created therein a furnace bath made from quartz sand and soda ash. Thereafter, the furnace is fed continuously with any sort of waste material to be disposed of including trash and garbage, industrial waste, sludge from sewage settling tanks and the like. Whenever the trash or refuse to be disposed of enters the furnace, it immediately is surrounded by the revolving bath within the furnace and which bath is in the state of red heat. In a very short time, the water contained in the refuse, which may be from 50 to 70%, is evaporated and the remaining refuse is heated up to ignition temperature. The furnace bath transfers heat intensively to the refuse and operates within the temperature region above 1100° centigrade. This temperature is within the reduction limit for effecting a dry distillation of highly chlorinated plastics and, in an after combustion chamber, which may be selectively employed in series with the main furnace, a total oxidation thereof will occur resulting in perfectly safe flue passing out of the stack 22.

The solids entrained in the trash, and which may include ceramics or glass and which have a normal melting point above 1600° C., may melt at a temperature below that melting point because of the presence of metal oxides, particularly iron oxide which has a tendency to reduce the melting temperatures of such materials down to about 1250° C. Iron oxide may, in fact, be added to the bath for this purpose if it does not develop naturally in the combustion process.

The molten materials developed within the furnace from the refuse are substantially neutral chemically and, where such materials take the form of glass, are drawn off and can be used for many purposes such as for the manufacture of colored glass, or for making construction materials and the like.

Rotary furnace 10 has a lining 11, which may be basic or acid in nature, depending on the characteristics of the waste to be handled.

A theromastatic element 23 detects the temperature of the gas leaving the rotary furnace and operates a valve regulator 25 for valve 27 in conduit 20 thereby to regulate the rate of supply of fuel to the furnace to maintain the furnace temperature within desired limits.

Chamber 3, interposed between the outlet of furnace 10 and stack 22, forms a combustion chamber through which the gases from the furnace pass and within which chamber further combustion of the gases can be effected, as by a supply of air thereto in a known manner.

It will be understood that this invention is susceptible to modification in order to adapt it to different usages and conditions; and accordingly, it is desired to comprehend such modifications within this invention as may fall within the scope of the appended claims.

What is claimed is:

1. A method of reducing unsorted refuse by combustion in a short drum-like rotary furnace which comprises maintaining the furnace at a predetermined temperature, maintaining a flowable furnace bath in the form of a melt suitable for the refuse in the furnace, feeding the refuse into the furnace to be enveloped in said bath, and withdrawing slag from the furnace.

2. The method according to claim 1, in which the said bath is in the form of quartz sand and soda ash.

3. The method according to claim 1, in which the maxium temperature within the furnace necessary to effect melting of refuse therein is controlled by the addition of materials such as iron compounds to the furnace bath which will reduce the melting point of various refuse materials introduced into the furnace to be reduced in the furnace.

4. A device for the reduction of waste materials by combustion comprising; a short drum-like rotary furnace rotatable on a horizontal axis and having central openings in its opposite ends substantially smaller in diameter than the inside diameter of said furnace, means at one end of the furnace adjacent the respective opening for introducing fuel and combustion air into the said furnace in one direction and for withdrawing combustion gases therefrom in the other direction, means for charging waste materials to be disposed of into the opening at the other end of the furnace, means for withdrawing slag from the furnace, and a melt in the furnace in the form of quartz sand and soda ash.

5. A device according to claim 4, which includes a basic lining in said furnace.

6. A device according to claim 4, which includes an acid lining in said furnace.

7. The device according to claim 4, which includes regulating means for regulating the supply of fuel to the furnace, and means sensitive to the temperature of the waste gases leaving the furnace and disposed in the path of said waste gases and connected in controlling relation to said regulating means for controlling the supply of fuel to the furnace.

8. A device according to claim 4, which includes a combustion chamber serially arranged with the furnace and through which the waste gases from the furnace pass, and means for introducing air into said combustion chamber for effecting after combustion of the said gases in said chamber.

References Cited

UNITED STATES PATENTS 2,071,835  2/1937  Hermanns _____ 110—14
3,306,237  2/1967  Ransom _____ 110—14

FOREIGN PATENTS 1,011,966  12/1965  Great Britain.

JAMES W. WESTHAVER, *Primary Examiner.*